May 13, 1952 — C. C. THIEM — 2,596,618

CLUTCH RELEASE ATTACHMENT FOR TRACTORS

Filed Nov. 29, 1949

INVENTOR.
CLARENCE C THIEM,
BY
McMorrow, Berman & Davidson
ATTORNEYS.

Patented May 13, 1952

2,596,618

UNITED STATES PATENT OFFICE 2,596,618

CLUTCH RELEASE ATTACHMENT FOR TRACTORS

Clarence C. Thiem, Markesan, Wis.

Application November 29, 1949, Serial No. 130,016

1 Claim. (Cl. 180—14.5)

This invention relates to clutch release attachments for tractors, and more particularly to an attachment for connecting the drawbar of a farm type tractor to the tractor clutch release lever for releasing the clutch when an implement connected to the drawbar encounters an obstacle, such as a stone or stump.

It is among the objects of the invention to provide an improved clutch release attachment for a tractor which can be easily mounted on a farm type tractor without any material modification of the tractor construction, and connected between the tractor drawbar and clutch release lever so that an implement connected to the tractor drawbar can be raised and lowered by the tractor implement lift mechanism without interfering with the attachment, and which is simple and durable in construction, economical to manufacture and highly effective and positive in operation.

Figure 1:
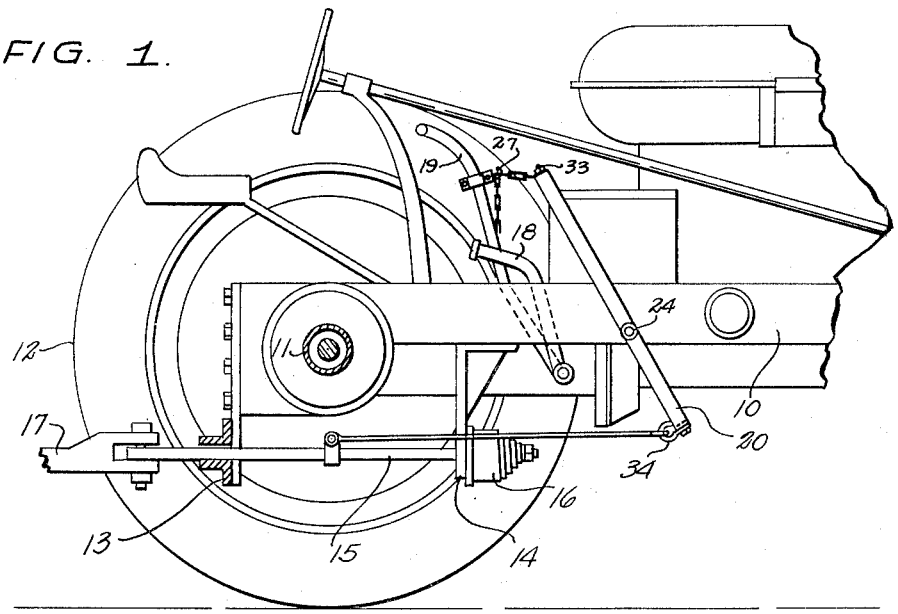
Figure 2:
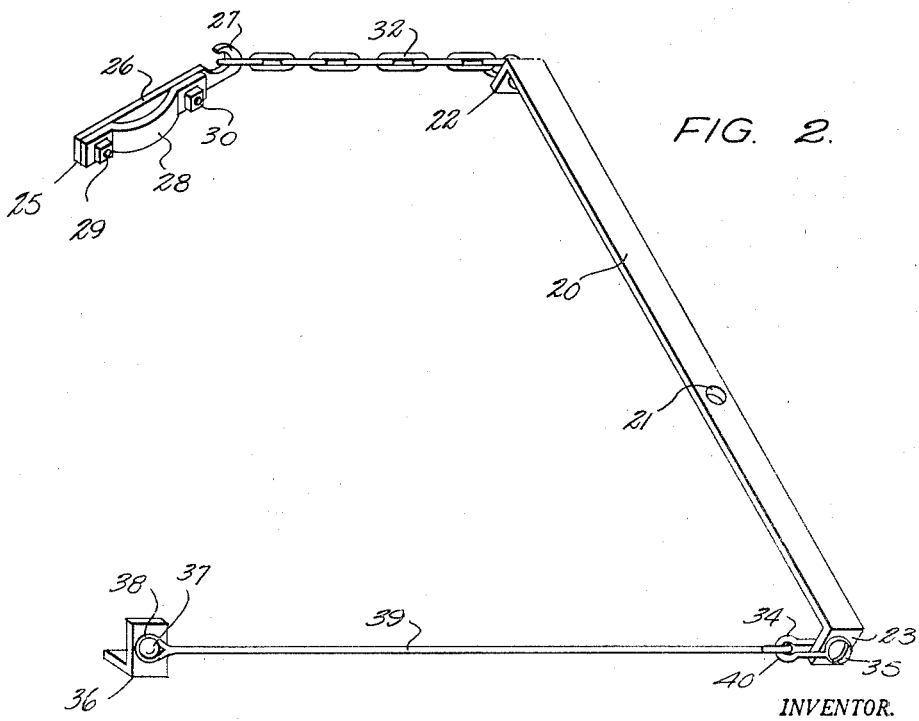

Other objects and advantages will become apparent from a consideration of the following description and the appended claims in conjunction with the accompanying drawing wherein:

Figure 1 is a side elevation of a fragmentary rear portion of a farm type tractor with a clutch release attachment illustrative of the invention operatively mounted thereon, one of the tractor rear wheels being omitted for the purpose of simplifying the illustration; and Figure 2 is a perspective view of the clutch releasing attachment of the invention.

With continued reference to the drawing, the tractor diagrammatically illustrated in Figure 1 has a frame 10, a rear axle 11 supporting the rear end of the frame and supported by the tractor rear wheels, one of which is indicated at 12, and a drawbar guide 13 secured to and depending from the tractor frame rearwardly of the rear axle 11. A bracket 14 is secured to and depends from the tractor frame forwardly of the rear axle 11 and is provided near its lower end with an opening and a drawbar 15 extends through the opening in the bracket 14 and through the drawbar guide 13. A compression spring 16 is interposed between the front end of the drawbar 15 and the forward side of the bracket 14 to resiliently connect the drawbar to the tractor so that the drawbar may have a limited freedom of resiliently resisted movement rearwardly of the tractor. An implement 17 is connected to the rear end of the drawbar 15 and is also connected to the tractor implement lift mechanism, not illustrated, in a manner well known to the art. The tractor has a main clutch operated by the foot pedal 18 and has an auxiliary clutch operated by the hand lever 19, which auxiliary clutch is effective only to control forward and rearward movements of the tractor, being moved forwardly to release the associated auxiliary clutch.

As the tractor and implement, such as a plow, are of well-known construction, a more detailed illustration and description thereof is considered unnecessary for the purposes of the present disclosure.

The attachment of the present invention comprises an elongated substantially straight lever 20 having an aperture 21 intermediate its length and disposed between its mid-length location and one end thereof, and has upset end portions 22 and 23 which extend in the same direction perpendicularly from the intermediate portion of the lever, and each of which is provided with a screw hole therethrough.

A bolt 24 extends through the aperture 21 in the lever and into an aperture in the tractor frame 10 adjacent the clutch hand lever 19 to pivotally mount the lever 20 on the tractor frame in a substantially upright position forwardly of the clutch release lever 19.

A clamp 25 is provided for attachment to the clutch lever 19 and comprises a straight bar 26 having spaced apart bolt holes therethrough, and a hook 27 at one end, and a curved plate 28 having bolt holes near its respectively opposite end which bolt holes are registrable with the bolt holes in the plate 26. Bolts 29 and 30 extend through registering bolt holes in the bar 26 and plate 28, and when the clutch lever 19 is disposed between the bar and the curved plate, and the nuts of the bolts 29 and 30 are threaded down, the clutch releasing hand lever 19 is firmly gripped in the clamp 25. The clamp is applied to the clutch lever in a position such that the hook 27 is at the end of the clamp adjacent the lever 20.

A short length of chain 32 is secured at one end to the upper end of the lever 20 by a screw 33 which extends through the end link of the chain and through the screw hole in the upset portion 22 of the lever, and this chain is adjustably connected to the hook 27 to connect the upper end of the lever to the clamp 25.

A clevis 34 is connected to the upset portion 23 at the lower end of the lever 20 by a screw 35 extending through eyes of the clevis and through the screw hole in the upset lever portion 23, and is pivotally connected at one end to the clevis 34, An angle bracket 36 is secured to the draw bar 15 intermediate the length of the latter and the rod 39 is pivotally connected at its other end to the angle bracket 36 by means of a bolt or screw 37 which extends through an eye 38 at the end of a rod 39 and through an aperture in the angle bracket. The end of the rod 39 connected to the clevis 34 is provided with a hook or eye 40 which is engaged in the clevis 34 so that the rod 39 connects the bracket 36 to the lower end of the lever 20. The bracket 36 is secured to the tow bar 15 intermediate the length of the latter by suitable means, such as by being welded to the tow bar, and the attachment thus operatively connects the tractor tow bar to the tractor clutch release lever 19.

With this arrangement, when the implement, such as the plow 17, strikes an obstruction, such as a large stone or stump, the drawbar 15 is pulled rearwardly against the force of spring 16. This movement of the drawbar swings the lower end of the lever 20 rearwardly, and the upper end of this lever forwardly about the pivot bolt 24 and, the upper end of the lever being connected to the clutch release lever 19, the clutch release lever 19 is pulled forward to release the clutch to which it is connected, thereby stopping the forward movement of the tractor and eliminating damage to the implement.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

In combination with a tractor having a frame, a draw bar slidably mounted on said frame for longitudinal movement and extending rearwardly of the tractor, a spring connected between said frame and the front end of said draw bar resiliently resisting longitudinal movement of said draw bar in a direction rearwardly of the tractor, and a clutch release lever mounted on said frame and movable in a direction forwardly of the tractor to release the associated clutch, means automatically moving said clutch release lever in its clutch releasing direction when the pull on said draw bar exceeds the force of said spring comprising an elongated lever pivotally mounted intermediate its length on said frame and disposed in substantially upright position ahead of said clutch release lever, a clamp mounted on said clutch release lever and having a forwardly projecting hook formation, a flexible element connected at one end to said lever at the upper end of the latter and adjustably connected to said hook formation, a bracket secured on said draw bar rearwardly of the lower end of said lever, and a link pivotally connected at one end to said bracket and at its other end to said lever at the lower end of the latter to swing the upper end of said lever forwardly when said draw bar moves rearwardly of said frame against the force of said spring.

CLARENCE C. THIEM.

REFERENCES CITED

The following references are of record in the file of this patent:

UNITED STATES PATENTS

| Number | Name | Date |
|---|---|---|
| 1,378,953 | Heylman | May 24, 1921 |
| 1,494,238 | Hallgren | May 13, 1924 |
| 1,587,416 | Reed | June 1, 1926 |
| 1,765,908 | Drennan | June 24, 1930 |
| 2,185,170 | Armstrong | Jan. 2, 1940 |
| 2,504,729 | Rajan | Apr. 18, 1950 |

FOREIGN PATENTS

| Number | Country | Date |
|---|---|---|
| 160,977 | Switzerland | Apr. 15, 1933 |